UNITED STATES PATENT OFFICE.

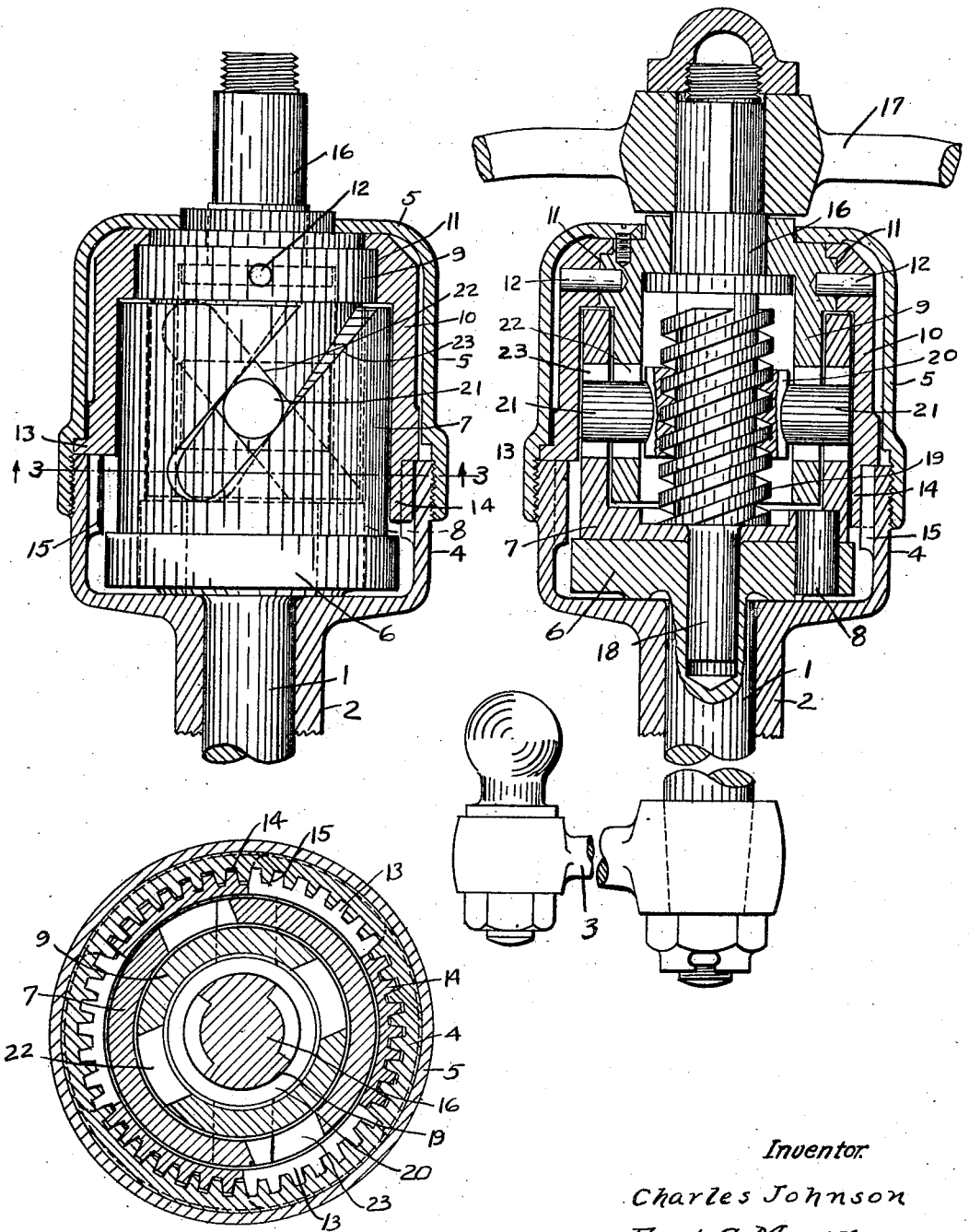

CHARLES JOHNSON, OF HIGHLAND PARK, AND FRED G. MEYER, OF DETROIT, MICHIGAN.

STEERING MECHANISM.

1,415,095.  Specification of Letters Patent.  Patented May 9, 1922.

Application filed July 3, 1921. Serial No. 483,196.

*To all whom it may concern:*

Be it known that we, CHARLES JOHNSON and FRED G. MEYER, citizens of the United States, residing, respectively, at Highland Park and Detroit, Michigan, have invented a new and useful Steering Mechanism, of which the following is a specification.

This invention relates to steering mechanism, and more particularly to motor vehicle steering mechanisms.

It is the object of the invention to provide for transmission of control movement from the steering wheel (or equivalent part) of a vehicle to the steering traction wheels in such manner as will prevent a reversed transmission of movement resulting from shocks or jars encountered by said traction wheels, and thus render a safe and positive control for directing the course of the vehicle.

In attaining this object the invention contemplates actuating the steering shaft through rotation of a screw and the resultant shifting of a nut thereon having angular sliding engagement with fixed and movable members through which rotative movement is imparted to said shaft. The pitch of the screw-threads prohibit any reverse transmission of effort.

A preferred embodiment of the invention is hereinafter described and illustrated in the accompanying drawing, wherein, Fig. 1 is an axial sectional view of the steering column of a motor vehicle, showing the improved mechanism.

Fig. 2 is a transverse section, showing in elevation the inner parts.

Fig. 3 is a cross section taken upon line 3—3 of Fig. 2.

In these views the reference character 1 designates the steering shaft of a motor vehicle, and 2 the usual non-rotative tubular column through which said shaft is extended. The lower extremity of the shaft 1 carries the usual steering crank 3, and the upper end of the tubular member 2 is enlarged, as is common, to form the lower or base portion 4 of a cylindrical casing, the upper part or cap 5 of which is screw-threaded upon said base portion. Rotatively mounted with the lower portion of the casing 4, 5, is a disk-shaped head 6 formed integrally upon the upper end of the shaft 1, and upon the head 6 is seated a cup-shaped member 7 having driving connection with said head through one or more vertical pins 8 interengaging the parts. An inverted cup-shaped member 9 and a sleeve 10 are respectively arranged concentrically interiorly and exteriorly of the member 7, and abutting above said member, as indicated at 11, are rigidly connected by a plurality of radial pins 12. The outer sleeve 10 has a plurality of radially projecting flanged sections 13 at its lower end adapted to seat upon the rim of the base portion 4 of the casing, and also has a plurality of spaced downwardly extending gear toothed sections 14 which mesh and interlock with the teeth of an internal gear ring 15 formed in the upper wall of the base member 4. In the steering mechanism of the well known Ford car, the teeth 15 are originally provided as a stationary annular gear, and it is one of the objects of the invention to replace the originally furnished steering mechanism of such a car by an irreversible type of mechanism so as to utilize the gearing as a means for conveniently securing certain of the parts against rotation. Thus the sleeve 10 is held stationary by the interlocking of its toothed extensions 14 with the gear teeth 15, and the rigid connection of said sleeve to cup-shaped member 9 also maintains the latter stationary. In alinement with the shaft 1 an actuating stem 16 therefor is extended through the casing 4, 5. The outer end of said stem being extended from said casing is rigidly engaged by the steering-wheel 17 and the inner end of the stem being reduced as indicated at 18 is journaled in the head 6 and the adjacent end portion of the shaft 1. Intermediately the stem 16 is screw-threaded as indicated at 19 and engages a nut 20 from which a pair of diametrically opposed trunnions or pins 21 project. Each of said pins engages in a pair of oppositely inclined spiral ways 22 and 23 respectively formed in the stationary cups 9 and in the movable cup member 7.

In the operation of the described invention, when the steering wheel 17 is turned, in either direction, the screw-threaded stem 16 is correspondingly rotatively actuated. This tends to feed the nut 20 longitudinally of the screw-threaded stem 16 and said nut will be compelled to undergo a limited rotative movement while feeding longitudinally of said stem, owing to the slidable engagement of the pins 21 in the spiral ways 22 of the stationary cup member 9. The rotative component of the movement of the nut acts through the outer ends of the pins 21 to rotatively drive the member 7 and the steering shaft carrying said member. The longitudinally acting component of the motion of the nut acts, due to the inclination of the slot 23 in the member 7, to increase the first mentioned driving effect upon said member 7. A powerful leverage is afforded by the use of the screw and nut so that the operator may turn the steering traction wheels of the vehicle with comparative ease. The mechanism is such, however, as to lock said traction wheels against turning except in response to the controlling wheel 17, since the pitch of the screw-threads and the inclination of the spiral ways will not permit the nut 20 to move longitudinally to compel rotation of the stem 16 and wheel 17.

It will be readily seen that the invention renders the controlling wheel of a motor vehicle (or the like) unresponsive to shocks and jars encountered by the steering traction wheels, (or other controlled part) and thus materially decreases the muscular strain involved in driving. Furthermore, the construction is one that may be readily employed in replacement of the original steering mechanism adjacent the controlling wheel of a car of the well known Ford type.

What we claim is:

1. In a steering mechanism, the combination with a steering shaft, of a screw-threaded actuating member for said shaft, a nut engaging the threads of said actuating member, a hollow member carried by said shaft and enclosing said screw, means compelling a limited rotation of said nut, as it is longitudinally shifted by rotation of said actuating member, and means rotatively driving said hollow member from the nut.

2. In a steering mechanism, the combination with a steering shaft, of a screw-threaded actuating member for said shaft, a nut engaging the threads of said actuating member, a pin projecting from the nut, a spirally slotted stationary member, the slot of which is engaged by said pin to compel a limited rotation of the nut, as the same is longitudinally shifted by rotation of said actuating member, and a driving element for said shaft having a spiral slot engaged by said pin.

3. In a steering mechanism, the combination with a steering shaft, of a screw-threaded actuating member for said shaft, a nut engaging the threads of said actuating member, a pin projecting from the nut, a stationary member formed with a spiral way engaged by said pin to compel a limited rotation of the nut, when longitudinally shifted through rotation of said actuating member, a member formed with an oppositely inclined spiral way, carried by said shaft, and a second pin carried by said nut engaging in the last mentioned spiral way, whereby rotation of the nut is compelled by the stationary member, and is communicated through the pins and rotative member to said shaft.

4. In a steering mechanism, the combination with a steering shaft, of a screw-threaded actuating member for said shaft, a nut engaging the threads of said actuating member, a projection from said nut, and a pair of members respectively stationary and carried by the steering shaft, formed with oppositely inclined spiral ways engaged by said projection, whereby both the longitudinal and rotative travel of the nut are effective to compel rotation of said shaft.

5. In a steering mechanism, the combination with a steering shaft, of a screw-threaded actuating member for said shaft, a nut engaging the threads of said actuating member, a pair of pins oppositely projecting from said nut, inner and outer hollow members surrounding said screw and formed with oppositely inclined spiral slots engaged by said pins, said members being respectively stationary and fast upon said shaft, whereby longitudinal travel of the nut responsive to rotation of the screw compels rotation of the hollow member carried by the shaft and such rotation is further compelled by the rotative actuation of the nut.

In testimony whereof we sign this specification.

CHARLES JOHNSON.
FRED G. MEYER.